United States Patent [19]

Basile et al.

[11] Patent Number: 4,899,220
[45] Date of Patent: Feb. 6, 1990

[54] METHOD AND APPARATUS FOR RECOMBINING A MAIN PANEL COMPONENT WITH A AUGMENTATION PANEL COMPONENT TO CREATE A WIDE ASPECT RATIO TELEVISON DISPLAY

[75] Inventors: Carlo Basile, New York; Alan P. Cavallerano, Ossining; Mikhail Tsinberg, Riverdale, all of N.Y.

[73] Assignee: North American Philips Corporation, New York, N.Y.

[21] Appl. No.: 57,848

[22] Filed: Jun. 2, 1987

[51] Int. Cl.$^4$ .............................................. H04N 7/04
[52] U.S. Cl. .................................... 358/141; 358/142
[58] Field of Search ............. 358/141, 142, 146, 147, 358/13, 22, 181, 182, 183, 134, 12; 360/24, 23, 22, 61, 64

[56] References Cited

U.S. PATENT DOCUMENTS

| | | | |
|---|---|---|---|
| 4,581,640 | 4/1986 | Cole | 358/12 |
| 4,602,286 | 7/1986 | Kellar et al. | 358/22 |
| 4,631,584 | 12/1986 | Reitmeier | 358/147 |

OTHER PUBLICATIONS

LoCicero et al., "Edge Stitching of a Wide-Aspect Ratio HDTV Image" IEEE, CH2314-3, 14.5.1-14.5.5, 1986.

Primary Examiner—James J. Groody
Assistant Examiner—David E. Harvey
Attorney, Agent, or Firm—Algy Tamoshunas; Marianne R. Rich

[57] ABSTRACT

For a wide aspect ratio display, the main panel component and augmentation panel component at the transmitting end into which the horizontal line signals of hte source were decomposed are reconstituted at the receiving end by joining the previously separated components together at stitch points. In order to decrease the visibility of the stitch points in the reconstituted wide aspect ratio display, the location of the stitch point in each line is varied. The variation may be on a frame-to-frame bais or on a line-to-line basis. The latter is the preferred form, the line-to-line variation being, preferably, a random variation.

14 Claims, 9 Drawing Sheets

FIG. 1
DEFAULT CONDITIONS: WIDE ASPECT AND STANDARD COMPATIBLE IMAGE

FIG. 3
CENTER/PANEL SEPARATION AND RECOMBINATION

FIG. 4

DECOMPOSING A WIDE ASPECT RATIO PICTURE
INTO A 4:3 AND TWO SIDE PANELS a) SEPARATION WITHOUT OVERLAP b) SEPARATION WITH X-1 OVERLAPPING,
REDUNDANT SAMPLES AT EACH
CENTER/PANEL CUT POINT

FIG. 7
RECOMBINATION OF CENTER AND PANELS TO FORM A WIDE ASPECT RATIO IMAGE

METHOD AND APPARATUS FOR RECOMBINING A MAIN PANEL COMPONENT WITH A AUGMENTATION PANEL COMPONENT TO CREATE A WIDE ASPECT RATIO TELEVISON DISPLAY

CROSS-REFERENCE TO RELATED APPLICATIONS:

"Decomposition and Recombination of a Wide Aspect Ratio Image" by the same inventors, assigned to the same assignee and filed simultaneously herewith.

FIELD OF THE INVENTION

The present invention relates to television transmission and reception and, in particular, high definition television wherein a wide-aspect ratio television signal is generated at the transmitting end and this signal is decomposed into a main panel component adapted to be received on a standard NTSC receiver, and one or more augmentation panel components. For reception as a high definition television signal with a wide-aspect ratio, the two or more panels must be recombined at the receiver.

BACKGROUND OF THE INVENTION

A number of U.S. patents have issued describing compatible high definition television systems. However, none of these patents teaches a method or apparatus for generating the main and augmentation panels at the transmitter and recombining this information at the receiver.

Also known is a paper called "Edge Stitching of a Wide-Aspect Ratio HDTV Image" by J. L. Lo Cicero, M. Pazarci and T. S. Rzeszewski. While this gives mathematical analyses of the problem, no practical implementation is taught.

SUMMARY OF THE INVENTION

The way in which a wide aspect ratio display is divided into several panels at the transmitter and the way in which the recombinatioin of these panels takes place at the receiver is crucial in determining the quality of the display. Even when the luminance and chrominance signals generating the main panel and augmentation panel displays are properly aligned in gain, time and phase at the receiver, a clearly visible vertical line with dot crawl would be created at each panel-to-panel junction. Such an artifact would render the display unacceptable to a viewer.

It is an object of the present invention to furnish a method and system of decomposing a wide-aspect ratio image into a main panel and at least one augmentation panel for transmission or recording, and recombining the panels at a receiving so that a viewer cannot see any indication of the "stitching" between the panels.

In accordance with the present invention, the plurality of horizontal line signals which together constitute a wide aspect ratio television display are each considered to have a main panel component having a first main panel end and a second main panel end, and at least one augmentation panel component having a first augmentation panel end adjacent the second main panel end, and a second augmentation panel end. At the transmitter, there is extracted from each horizontal line signal a first extracted signal which includes the main panel component, a plurality of main panel redundant samples (pixel values) extending from the second main panel end into the augmentation panel component, and a multiplicity of main panel transition samples which are weighted samples extending from the redundant main panel samples towards the second augmentation panel end and forming a transition from full main panel component value to a second value such as, e.g., zero.

Similarly, a second signal includes the augmentation panel component, redundant augmentation panel samples and transition samples. At the receiver, the augmentation and main panel components are recombined by deleting the transition samples and weighting the redundant samples of the two panels to effect a smooth transition.

Further, the position in the horizontal line at which a stitch point occurs may be varied, thereby decreasing the visibility of the stitch in the final display.

The objects and features of the present invention will be clearly understood upon consideration of the following detailed description, when read in conjunction with the drawings.

DESCRIPTION OF THE PREFERRED EMBODIMENTS

Figure 1:
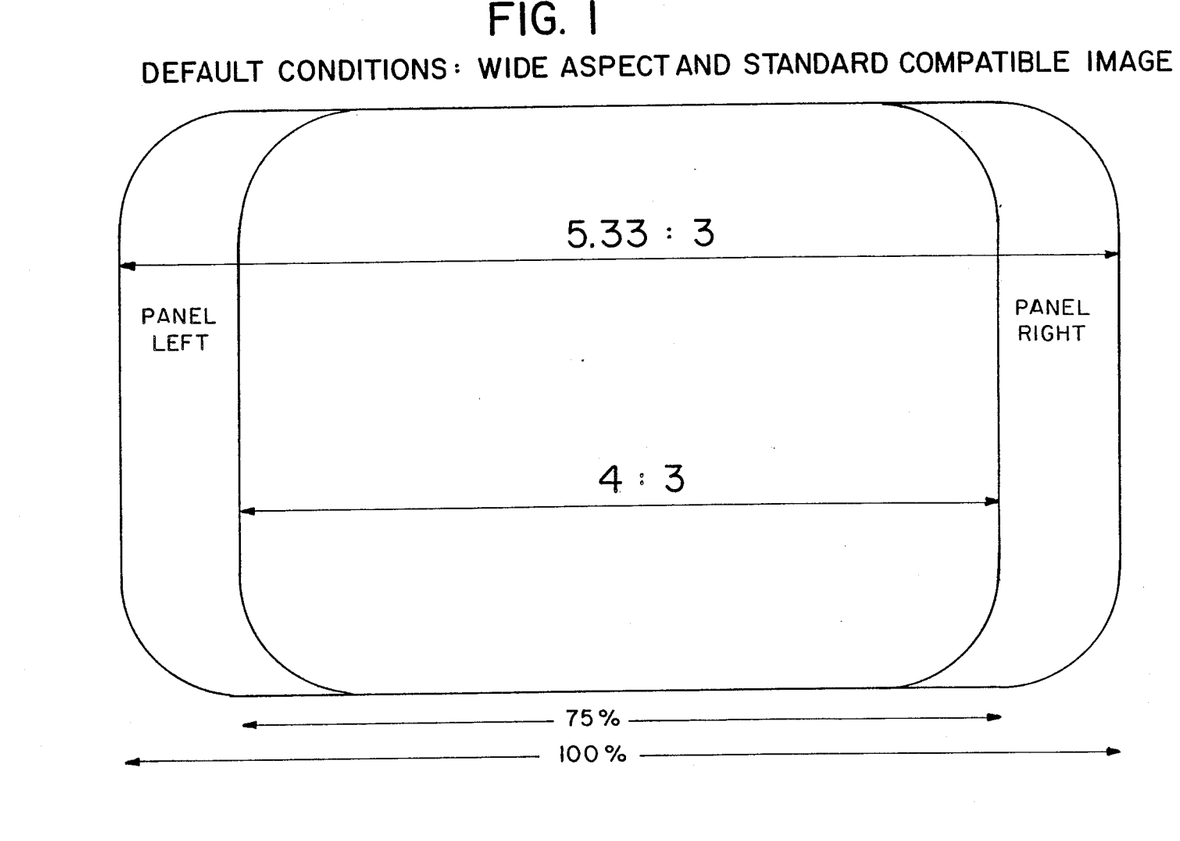
FIG. 1 illustrates a wide-aspect ratio image at the source, with extracted 4:3 main panel two augmentation panels.

The present invention will be described with respect to the embodiment shown basically in FIG. 1. Here, the output of a television camera or a telecine source has an aspect ratio of 5−1/3:3. For purposes of this example, the main panel is a center panel compatible with, and suitable for, reception on NTSC television receivers currently in service. This main center panel is flanked on each side by an augmentation panel, denoted by panel left and panel right, respectively. It should be noted that the present invention is entirely applicable to any situation wherein a given signal is divided into two or more panels, the panels then having to be recombined to yield a desired output display. The embodiment discussed here, wherein a center panel video signal is flanked by two side panels of equal width, is therefore to be considered illustrative only.

Figure 2:
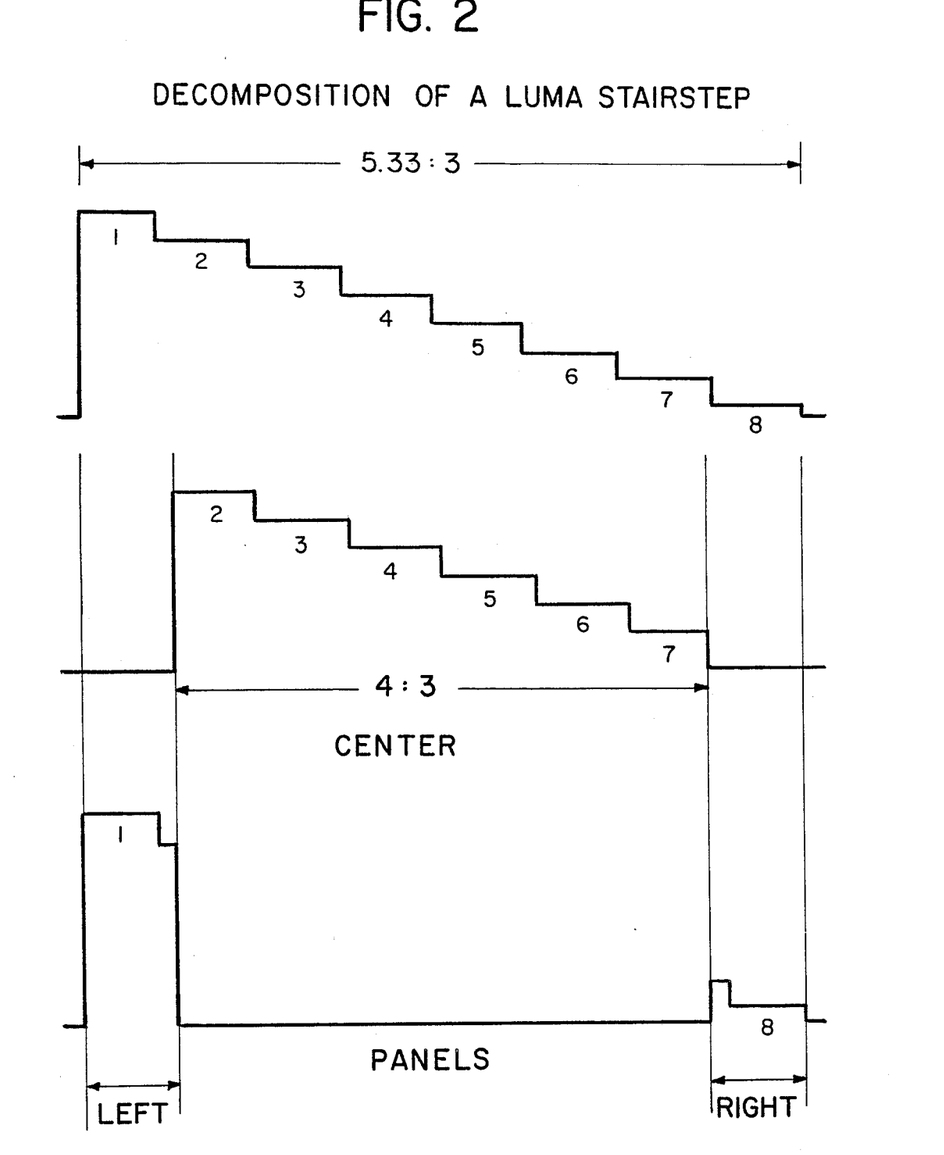
FIG. 2 illustrates a staircase luminance variation at the source and the resulting main and augmentation panels.

For further purposes of illustration, FIG. 2 shows a luma staircase example for one line of the television signal. FIG. 2a illustrates the 5−1/3:3 source which is divided into a center panel including most, but not all, of steps 2 and 7 at its respective extremities, and two side panels including, for the left panel, step 1 and part of step 2 and, for the right hand panel, part of step 7 and step 8.

Figure 3:
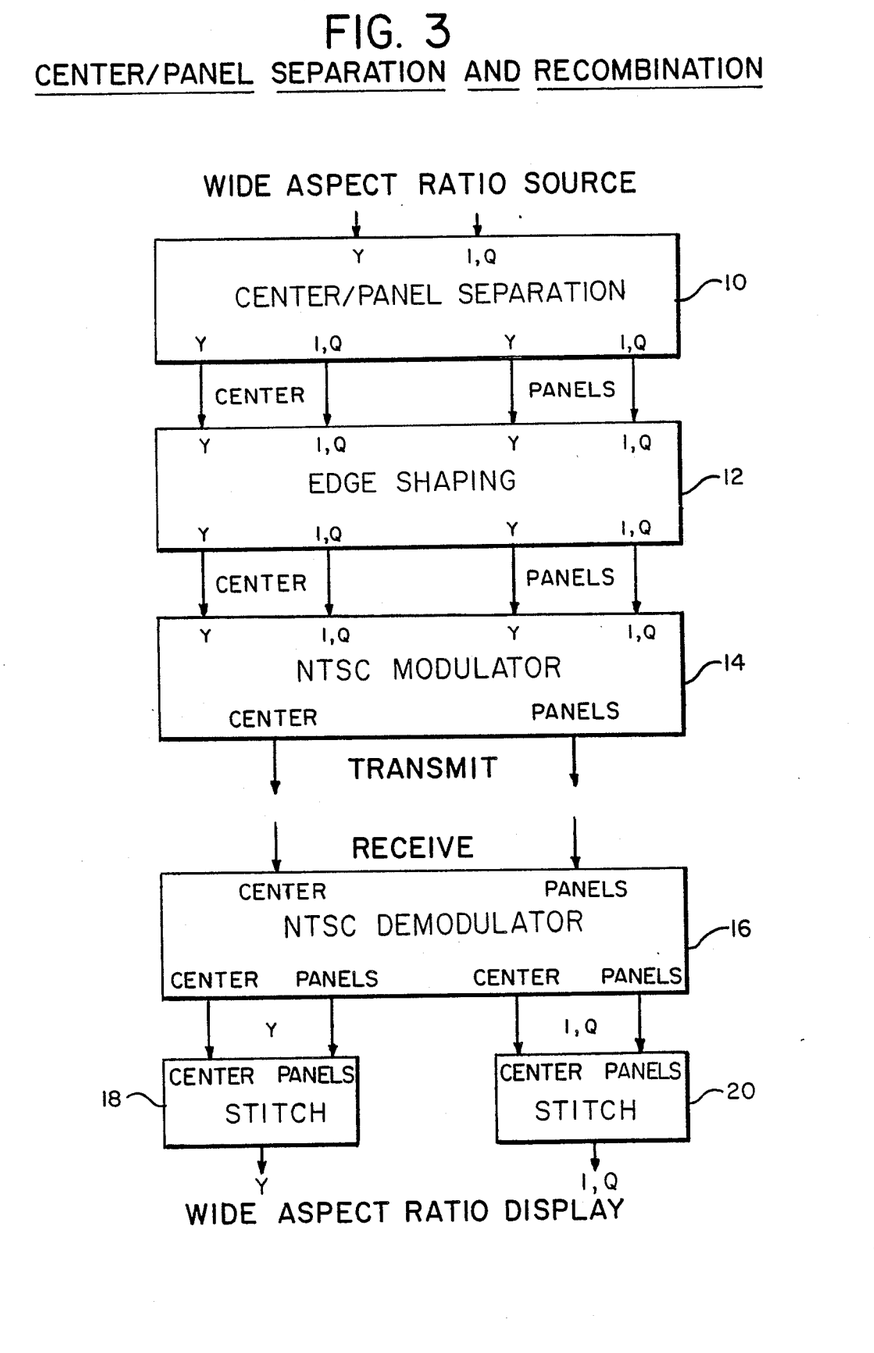
FIG. 3 is a block diagram of apparatus for main panel/augmentation panel separation and recombination in accordance with the present invention.

As illustrated in the block diagram of FIG. 3, in the present preferred embodiment the wide aspect ratio source is subjected to luma/chroma separation, the luminance signal Y and the chrominance signals I, Q being applied to a center/panel separator stage 10. At the output of separator stage 10 there are thus two sets of luminance/chrominance signals, namely the luminance signal (Y) and chrominance signals (I, Q) associated with the center panel, and the luminance and chrominance signals associated with the side panels. The six signal packets are then passed through an edge shaper 12 and processed for transmission in a modulation stage 14 as is well known for NTSC transmission, or transmission in another standard as appropriate.

In a receiver stage 16, the individually received center and side panel signals are subjected to NTSC demodulation. The luminance signal is then applied to a luminance center/panel stitch stage 18, while the chrominance signals are applied to a similar stage 20. The resulting combined luminance and combined chrominance signals are then ready for display on a wide aspect ratio receiver.

Figure 4:
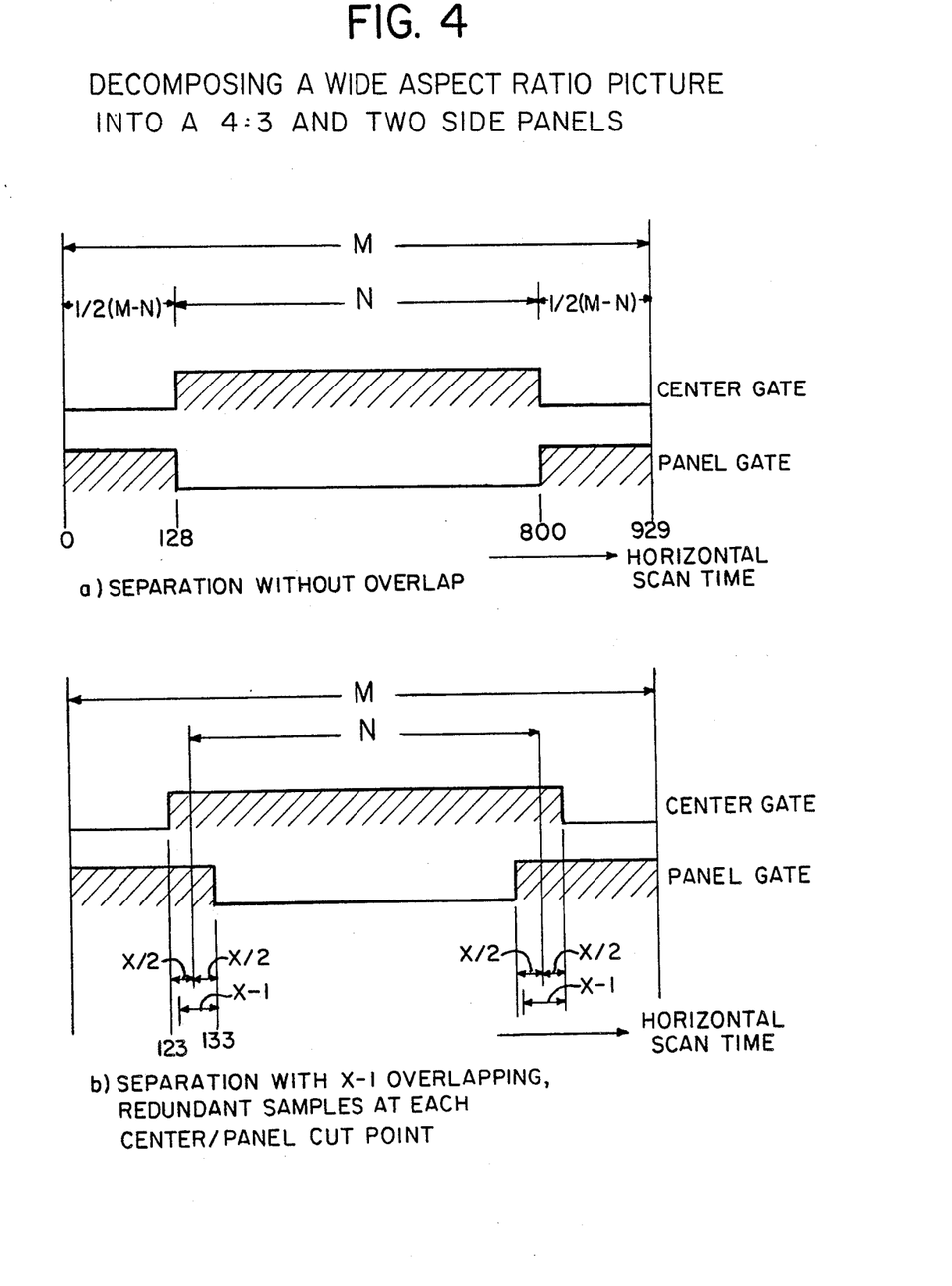
FIG. 4a illustrates gating signals for decomposing a wide aspect ratio picture into a 4:3 panel and two side panels without overlap.
FIG. 4b illustrates gating signals as in FIG. 4a, but with X−1 overlapping redundant samples at each stitch point.

Two ways of timing gating signals for use in separator stage 10, i.e. for decomposing a wide aspect ratio picture into a 4:3 aspect ratio picture and two side panels are illustrated in FIG. 4. In both FIG. 4a and FIG. 4b, the wide aspect ratio width is assumed to include M sampling points (pixels). In FIG. 4a these M pixels are divided into N center panel pixels and, on each side ½×(M−N) side panel pixels. This type of gating results in separation of the panels without overlap. A simple implementation of a suitable gating circuit is illustrated in FIG. 5a and will be discussed in connection therewith below. On the other hand, in FIG. 4b, the timing of gating signals for accomplishing separation with overlap are illustrated. Here, the M pixels of a line are divided into center panel pixels which include the actual center panel pixels N and X/2 pixels on each side of the N pixels, i.e. a total of X redundant pixel samples. Similarly, the panel gating signal extends each panel by X/2 redundant panel pixels into the area of the N center panel pixels. Thus, in each line the separation of the center panel from the two side panels creates X-1 overlapping redundant samples at each of the two separation or "stitch" points.

Figure 5:
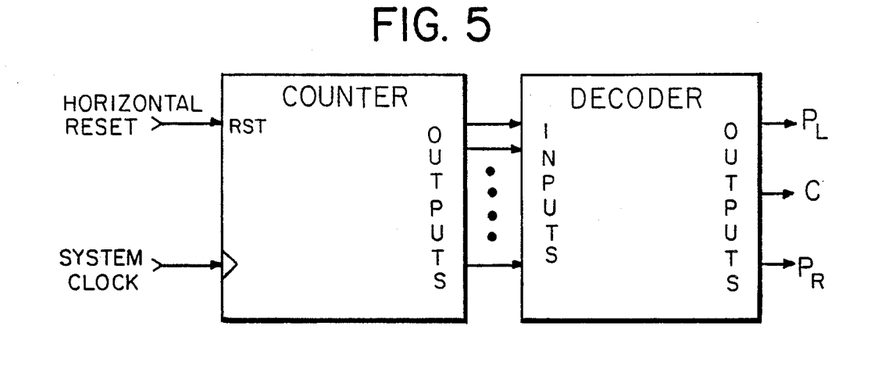
FIG. 5 is a block diagram for the enabling signals required in the signal extracting apparatus of FIG. 6.

FIG. 5 shows simple implementation of circuits for generating the gating signals illustrated in FIGS. 4a and 4b. A counter 50 counts clock pulses from the system clock and is reset by the horizontal synchronization signals of the video signal. The output signals from counter 50 are applied to a decoder 52. Decoder 52 furnishes the outputs $P_L$, C, and $P_R$, respectively. The first output is $P_L$, that is the left panel enable signal, active from pixel number 1 to pixel number 128. Next, center panel enable signal C for separating the center panel is activated. Finally, after the pixel equal to N+½ (M−N), namely pixel 800, the signal $P_R$ is activated and remains active until the end of the line.

The circuit of FIG. 5 can also represent the circuit necessary to implement the signal output illustrated in FIG. 4b. The only difference is that the signal $P_L$, which still starts at pixel 1, continues not to pixel 128, but to pixel 133. At the same time, signal C starts not at pixel 128 as above, but instead, at pixel 123, so that signals $P_L$ and C are active simultaneously over a range of 11 pixels. On of these pixels must be carried by one signal anyway, and is not considered redundant. The same is true at the right-hand side. The signal $P_R$ starts prior to cessation of the signal C, while the signal C continues past the former cut-off, for an additional period of 5 pixels. There is thus, both at the right-hand and at the left-hand side, an overlap of X−1=10 pixels.

Figure 6:
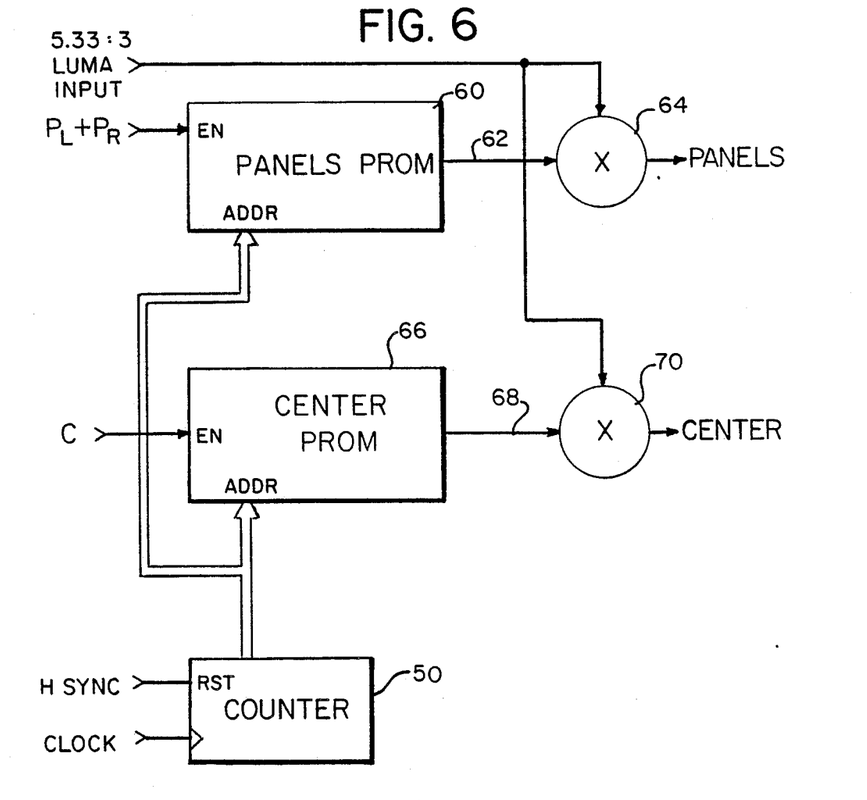
FIG. 6 is a schematic diagram illustrating the panel extraction apparatus according to the present invention.

Due to bandwidth limitations, a roll-off, that is a more gradual rise and fall for the center panel and for the side panels is required. A cosine curve implemented as illustrated in FIG. 6 may be utilized for this purpose. It should be noted that the roll-offs take place outside of the above-described overlap range, i.e. beyond pixel 133, e.g. for pixels 134-138 for the left panel; 118-122 for the left side of the center panel, etc.

Referring now to FIG. 6, the signals $P_L$ and $P_R$ are applied to the enable input of a programmable read-only memory 60 which is the memory for the panels. This PROM is thus enabled for either $P_L$ and $P_R$. During the time that the PROM 60 is enabled, the addresses read-out from counter 50 cause the proper multiplication factors for generating the left panel component including overlap and cosine roll-off to appear on output lines 62 of PROM 60. This multiplication factor is then applied to the incoming luminance signal by a multiplier 64. Similarly, the signal C at the output of decoder 52 is applied to enable a PROM 66 which is the PROM storing the relevant addresses for the center panel. Again, the output of counter 50 addresses PROM 66 and the values read out from the addresses appear on output lines 68. These multiply the sampled value of the luminance signal ina multiplier 70, the resultant signals constituting the center panel signals with appropriate overlap and roll-off (herein also referred to as first extracted signals). While FIG. 6 illustrates the shaping of the cosine curve for the luminance signal, the process for the chrominance signals is identical and will therefore not be described herein. It is also possible to use the same method and apparatus for generating center and augmentation panel signals for baseband video, rather than for luminance and chromainance separately.

The signals at the outputs of multipliers 64 and 70 are thus the signals denoted as the center and side panel signals for the luminance signal Y at the output of edge shaper 12 in FIG. 3. These signals, along with the corresponding chrominance signals at corresponding outputs of corresponding stages for the I and Q components, are then transmitted, after suitable modulation in modulator stage 14.

Figure 7:
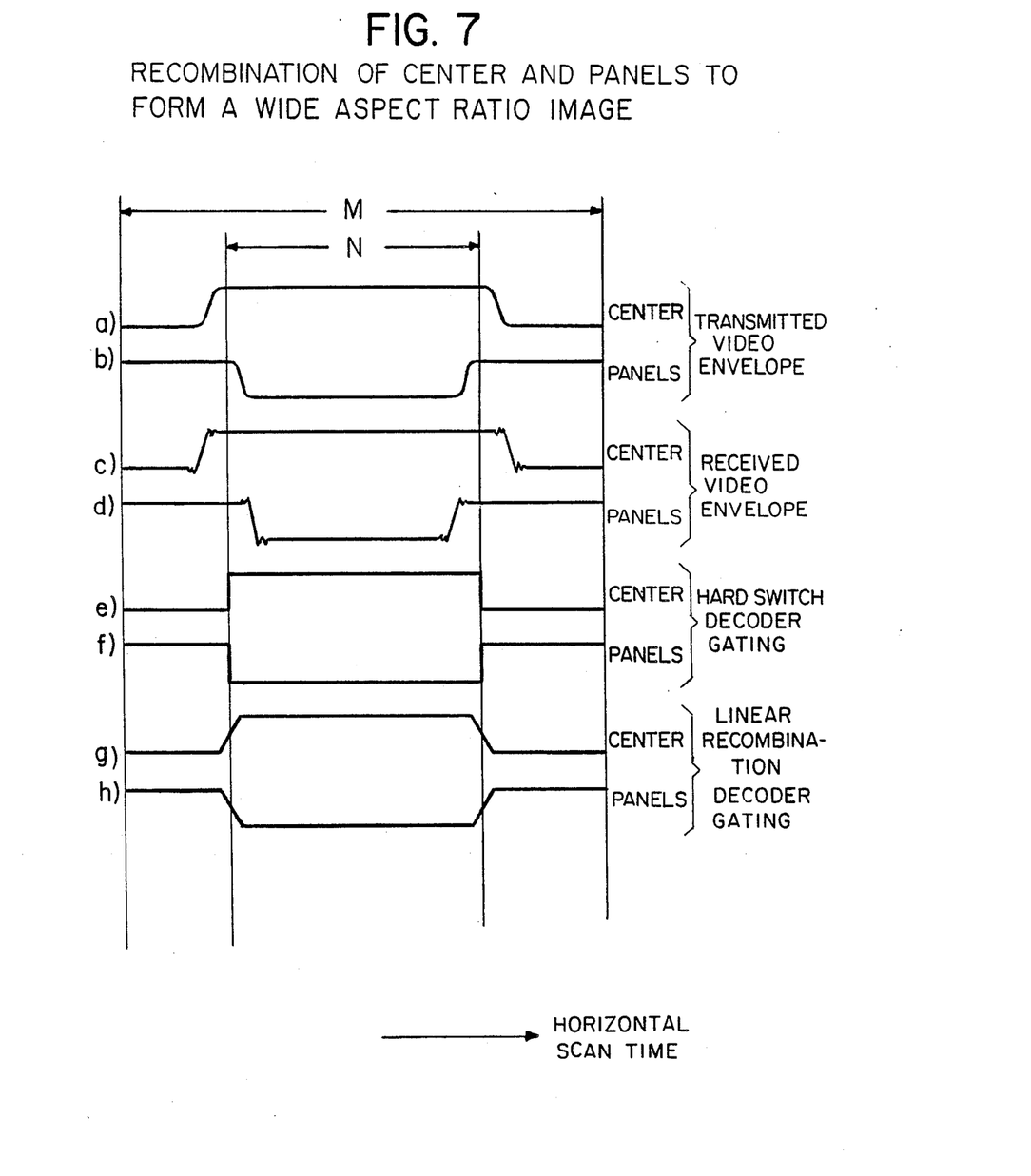
FIG. 7 illustrates the transmitted and received video envelopes and the gating signals according to the present invention.

The transmitted signals are received at a demodulator 16. With the exception of the "panel fade" input discussed below, the actual modulation and demodulation are not part of the present invention, are well known, and will therefore not be discussed in detail. It is sufficient to say that the output of demodulator stage 16 consists of three sets of signals, namely the Y signals for the center and side panels and the I, Q center and side panel signals. The waveshape for, for example, the Y signal is illustrated in FIG. 7c for the center panel and FIG. 7d for the side panels. It will be noted that due to transmission and reception, some ringing in the form of oscillations is created at each inflection point, in spite of the cosine roll-off. However, in accordance with the present invention, these oscillations do not form part of the display; i.e. they are gated out at the receiver.

Figure 8:
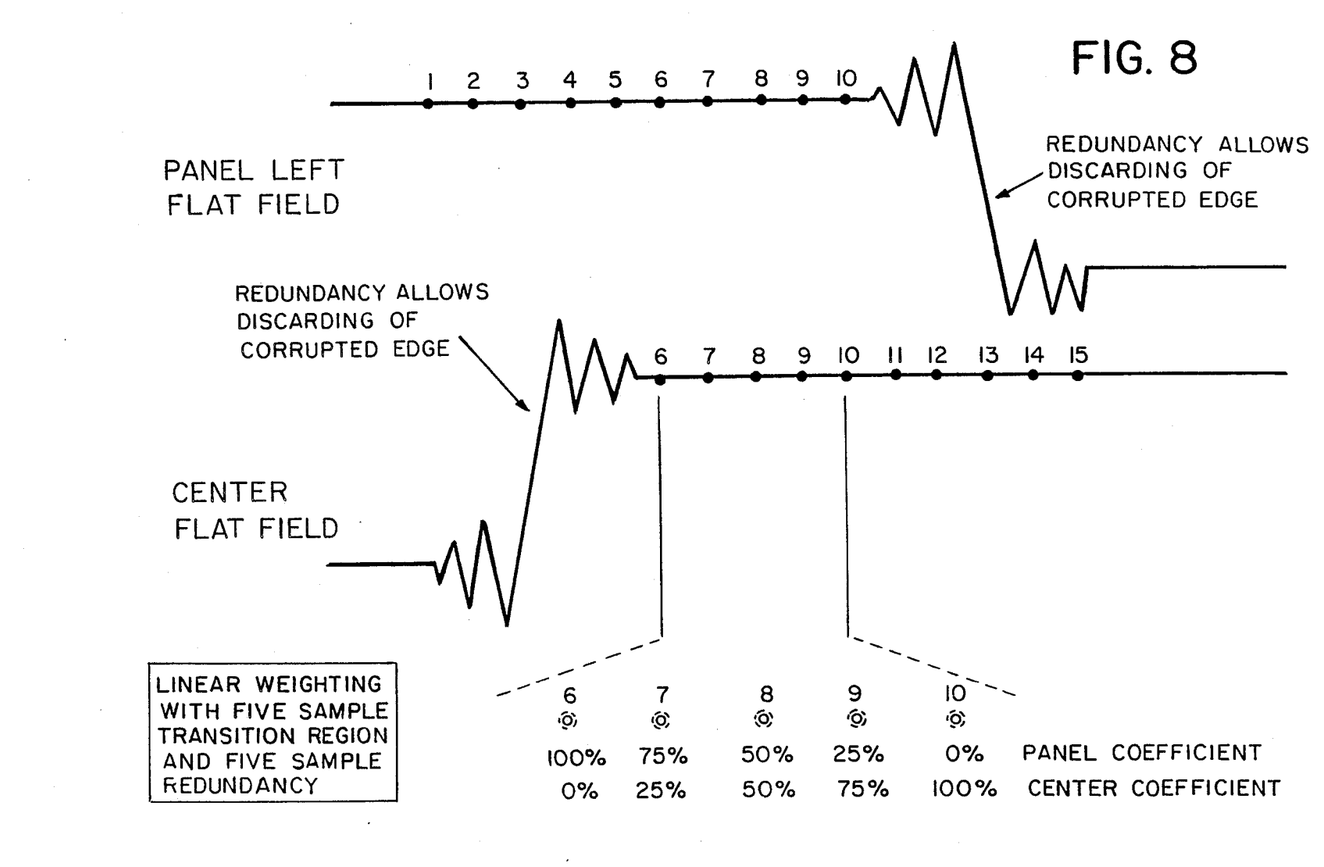
FIG. 8 illustrates graphically the main panel-augmentation panel stitch with a five sample overlap for linear recombination decoder gating.

A preferred linear combination gating scheme at the receiver is illustrated in FIG. 8.

Specifically, FIG. 8 illustrates an example of linear weighting for a left panel-center panel stitch with five sample overlap. The top line shows the luminance variation in the left panel, while the bottom line indicates the luminance variation for the center panel. Pixel samples 1, 2, 3, 4 and 5 in the left panel are adjacent to the stitch proper which includes pixel 6, 7, 8, 9 and 10. It will be noted that the transition from left to center panel commences with pixel 6. Therefore the initial ringing of the center signal transition does not affect the final display at all. The linear transition commences at pixels 6, but is still 100% weighted for the left panel. Pixels 7 are weighted 75% left panel, 25% center panel; pixels 8 at 50-50, pixels 9, 25% left panel 75% i.e. the panel coefficient weight becomes 0 while the center coefficient weight is 100%.

Figure 9:
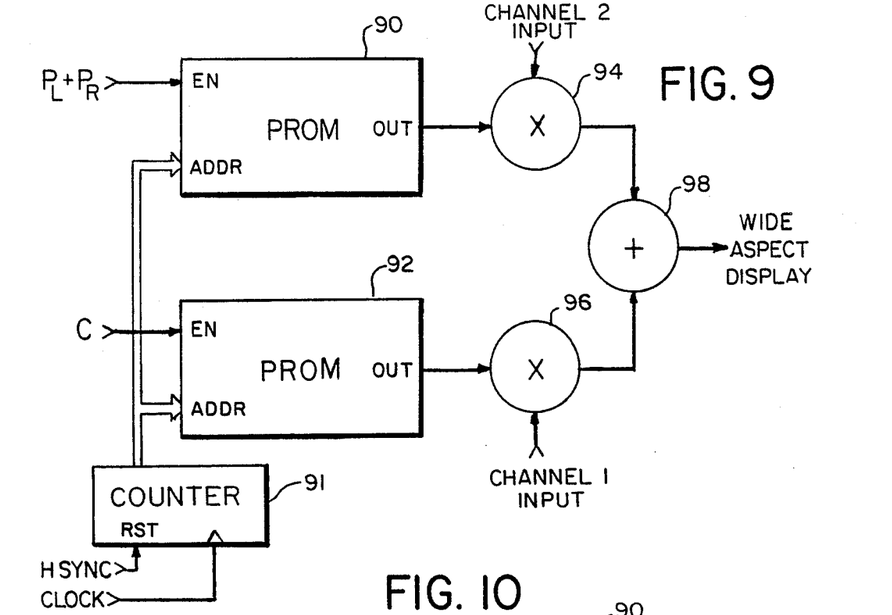
FIG. 9 is a block diagram of the receiver apparatus according to the present invention.

A circuit similar to the circuit of FIG. 5 in combination with the circuit of FIG. 9 is used to implement the above described weighting. $P_L$, $P_R$, C will be generated as illustrated in FIG. 5 and described with reference to the transmitter. Signals $P_L$ and $P_R$ are applied to the enable input of a PROM 90 which has a plurality of address lines connected to the output of a counter 91 reset, as was counter 50, by the received horizontal sync signals. (If the right and left panel signals are transmitted on a separate channel from the center panel signals, the video from both channels is applied to a time base corrector. The H sync signal is then available at the time base corrector output.) Similarly, signal C is applied to the enable input of a PROM 92, also having address lines connected to the output of counter 91. PROMS 90 and 92 hold the weighting factors associated with the side panels and the center panel, respectively, including the weighting factors associated with the redundant pixels as described above. The outputs of PROMS 90 and 92 are applied, respectively, to multipliers 94 and 96 whose second inputs receive the signals received on the second and first channel, respectively. The outputs of multipliers 94 and 96 constitute, respectively, the left and right panel signals with redundant samples suitably weighted for transition with the center panel signal at each of its ends, and the center signal with suitably weighted redundant samples at each end. The two signals are applied to respective inputs of an adder 98 at whose output appear signals suitable for display on a wide aspect ratio monitor.

The above description illustrates the decomposition and recombination of the wide aspect ratio signal on a single line, it being assumed that the stitching locations will be the same on all lines. The visual effect of the stitch can be decreased even further if the stitch location is varied somewhat [from line to line, from frame to frame, or in accordance with any other convenient plan.] For a line by line variation, the circuit of FIG. 10 may be used. There the address signals generated at the receiver are applied to one input of an adder 101. The second input of adder 101 is connected to the output of a random number generator 104 which is activated by the horizontal synchronization pulses. The outputs of the adder 101, when used to address PROMS 90 and 92 of FIG. 9, cause a variation in the start and end of the stitch intervals in a line, within the limits of the numbers within random number generator 104. The range of numbers in random number generator 104 may, for example, be ±2.

Figure 10:
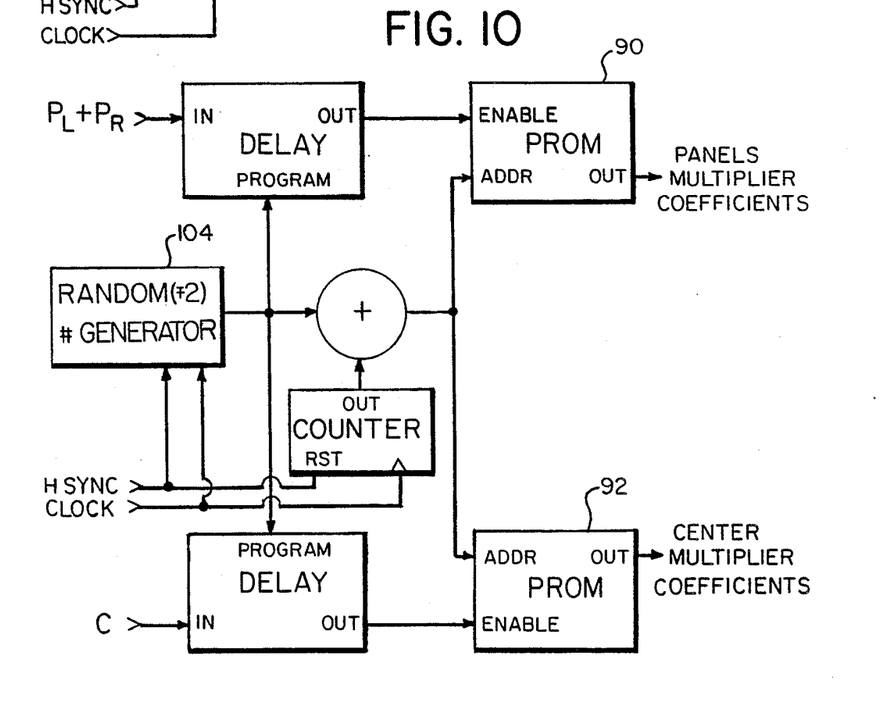
FIG. 10 is a block diagram illustrating apparatus for varying the stitch point location on a line-by-line basis.

Alternatively, random number generator 104 can be reactivated twice per line, resulting in a slight shift of the left stitch point relative to the right stitch point.

The enabling signals $P_L$, $P_R$ and C must either be delayed under control of the random number generator (delay units 106 and 108) or the range of pixels covered by each expanded to include all possible addresses given the range of random numbers.

It is also possible to omit the enabling signals entirely, if PROMS 90 and 92 store zero as a multiplication factor for all respective inapplicable addresses.

Finally, there is a preferred method for transmitting the left panel signals and the right panel signals on the second channel, if a two channel transmission system with multiplexed analog transmission is used. The most obvious way of arranging the sequence of signals in each line of the second channel would be as scanned, namely, the horizontal synchronizing signal, followed by the color burst, which is followed by the NTSC modulated left panel signal. The left panel signal is followed by, for example, audio signals, line differential signals for reconstructing the lines not transmitted in the first channel, and, finally, the right panel signal. This arrangement has the disadvantage that, for a pan and scan system, the respective widths of the left panel and of the right panel may change although the total side panel width will remain constant. Such changes would be difficult to carry out with this arrangement and are much simplified by transmitting the left panel signals immediately followed by the right panel signals, followed by the audio and line differential signals. Since changes in the width of the individual panels then do not affect the total panel width, both the audio and line difference signals would be in the same position in each line for any position of the center panel relative to the left and right panels.

Additional advantages are to be gained by the positioning of the right panel signals next to the left panel signals. As explained with reference to FIG. 8, the redundancy technique used at the receiver causes the right transition of the left panel and the left transition of the right panel to be discarded. Instead of rolling off the right part of the left panel signal and the left part of the right panel signal to zero at the transmitter, a linear fade (interpolation) from the last utilized sample of the left panel to the first utilized sample of the right panel may be used. This fade will also decrease the chance of ringing noted in FIG. 7d. Additionally, the fade may be accomplished in a shorter time than the roll-off in the two directions. The time saved can be utilized for carrying additional signals.

Figures 11A, 11B:
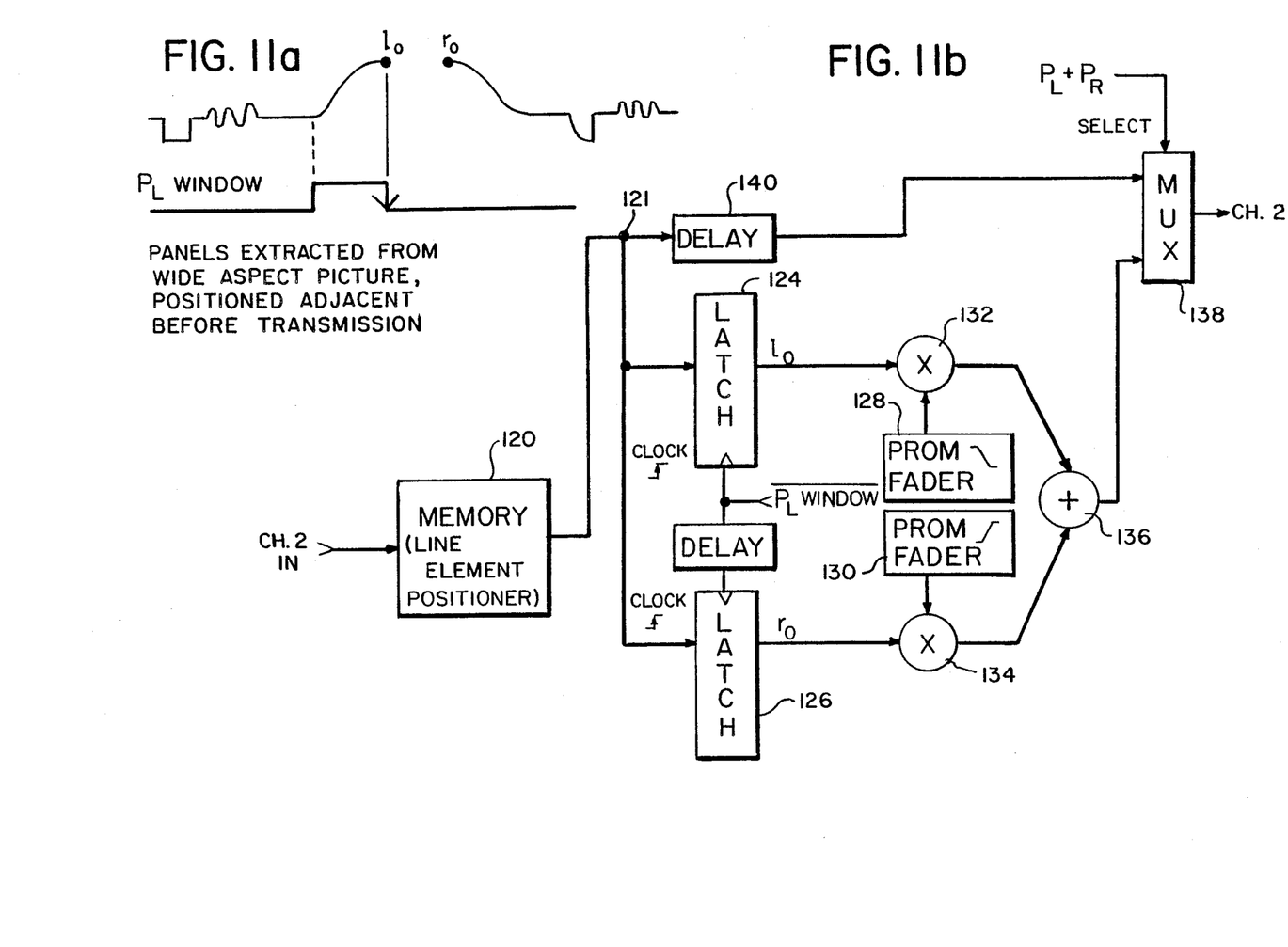
FIG. 11a illustrates the line format on an augmentation channel of a two channel system before fading.
FIG. 11b is a block diagram for time multiplexed transmission of two augmentation panel components on one channel.

The circuits illustrated in FIG. 11 can be used to accomplish this linear fade. The same circuit can be utilized whether the incoming signal is the luminance signal, one of the chrominance signals, or the composite television signal. In FIG. 11a it is assumed that the incoming signal is the second channel (side panel) luminance signal. The components of this signal, as scanned, are applied to a memory 120, for repositioning on the line. Insofar as the present invention is concerned, the output of memory 120 consists of, in each horizontal line, the transition samples at the rising edge of the left hand panel, the left hand panel itself, the redundant samples associated with the left hand panel, a transition gap of, for example, three samples, the redundant samples associated with the right hand panel, the right hand panel as such, and the transition samples at the trailing edge of the right hand panel. The additional signals, which will be positioned at predetermined time slots on the remainder of the lines, are not illustrated since they are not relevant to the present invention.

The repositioned signal is applied to the circuit illustrated in FIG. 11b. This has an input terminal 121. A latch 124, timed by the trailing edge of $P_L$, extracts the last valid sample (redundant sample) $l_o$ from the incoming signal. A latch 126 set by the same edge after a delay corresponding to the number of pixels between $l_o$ and $r_o$ extracts the first valid (redundant) sample $r_o$ from the right panel (see also FIG. 11a). A PROM fader, 128, operating in the same manner as the PROM 66 in FIG. 6, furnishes multiplying factors. These are applied to the sample at the output of latch 124 by a multiplier 132. Similarly, a PROM fader 130, operating as does PROM 66 in FIG. 6, supplies multiplication factors for the left panel sample extracted by latch 126. These multiplication factors are applied to one input of a multiplying unit 134 whose other input is the above-mentioned sample. The weighted signals from multiplier 132 are applied to one input of an adder 136 whose second input receives the weighted samples from multiplier 134. The transition signals from adder 136, representing the fade from $l_o$ to $r_o$, are applied to a multiplexer 138. Multiplexer 138 also receives the remainder of the second channel signals following a delay 140. Delay 140 is a delay corresponding to delay 129, plus any additional delay required to equalize processing time. Multiplexer 138 provides the appropriate gating between the two signals at its inputs. The output of the multiplexer 138 is thus the second channel signal ready for transmission.

At the receiver, the signal received on the second channel is applied to a memory (not shown). Readout from the memory takes place so that the augmentation and main channels are restored to their original relationship, i.e. the second augmentation panel component is followed by the main panel component which in turn is followed by the first augmentation panel component. Any additional signals such as audio signals and line difference signals follow in whatever empty slots may be on the line.

Although the system has been described in reference to a preferred embodiment, it should be noted that, throughout, chrominance signals could be substituted for the luminance signal, and even composite television signals can be used. Further, this system has been shown as embodied in certain hardware. Many variations of such hardware will be evident to one skilled in the art. Further, in many cases software can be substituted for the hardware in an obvious manner. Finally, although the system is discussed with reference to a two channel transmission, the invention is clearly applicable when transmission of the center panel and hte side panels is accomplished in one channel.

All of the above embodiments are therefore to be encompassed in the following claims.

We claim:

1. Apparatus for creating a wide aspect ratio display comprising a plurality of horizontal line signals, in response to a plurality of main panel component signals and a corresponding multiplicity of first and second augmentation panel component signals, said plurality of horizontal line signals constituting at least a portion of one field, said apparatus comprising:
   means for combining said plurality of main panel component signals with respective ones of said first and second augmentation panel component signals to create respective horizontal line signals, wherein for each horizontal line signal of said respective horizontal line signals the main panel component signal is combined with the first augmentation panel component signal at a first stitch point and said main panel component signal is combined with the second augmentation panel component signal at a second stitch point, and
   means connected to said combining means for varying the location of at least one of said first stitch point and said second stitch point in at least one of said horizontal line signals relative to another of said horizontal line signals within said portion.

2. Apparatus as set forth in claim 1, wherein said combining means comprises first and second gating means for, respectively, gating said main panel component signals and said first and second augmentation panel component signals, and timing means for controlling outputs of said first and second gating means over time; and
   wherein said stitch point location varying means comprises time varying means for operating in conjunction with said timing means to vary a control timing of said timing means with respect to said first and second gating means.

3. Apparatus as set forth in claim 2, wherein said first gating means comprises first memory means having constants stored in addressable memory locations, and first multiplier means having a first input connected to said memory means and a second input connected to receive said main panel component signals;
   wherein said second gating means comprises second memory means having addressable memory locations storing a plurality of constants, and second multiplier means having a first input connected to said second memory means and a second input connected to receive said first and second augmentation panel signals;
   wherein said timing means comprises means for generating clock signals each defining a signal sample instant, means for generating horizontal synchronization signals for timing said horizontal line signals, counter means connected to receive said horizontal synchronization signals and said clock signals for furnishing counter output signals corresponding to the number of counted clock signals, and means applying said counter output signals to address inputs of said first and second memory means; and
   wherein said time varying means comprises means for changing said counter output signals prior to application of said counter output signals to said address inputs of said first and second memory means.

4. Apparatus as set forth in claim 3, wherein said time varying means comprises a random number generator operative under control of said horizontal synchronization signals for generating random number signals within a predetermined range, and adding means for adding said random number signals to said counter output signals to constitute address signals for said first and second memory means.

5. Method for combining received main panel component signals with respective ones of received first and second augmentation panel component signals to generate wide aspect ratio horizontal line signals, comprising the steps of
  combining said main panel component signals with respective first and second augmentation panel component signals to constitute respective ones of said wide aspect ratio horizontal line signals wherein for a particular wide aspect ratio horizontal line signal of said wide aspect ratio horizontal line signals said main panel component signal is combined with said first augmentation panel component signal at a first stitch point and said main panel component signal is combined with said second agmentation panel component signal at a second stitch point; and
  varying the location of at least one of said first stitch point and said second stitch point in at least one of said wide aspect ratio horizontal line signals relative to another of said wide aspect ratio horizontal line signals thereby decreasing the visibility of stitching in a wide aspect ratio display.

6. A method as set forth in claim 5, wherein said step of varying said location of at least one of said first stitch point and said second stitch point comprises randomly varying said location of at least one of said first stitch point and said second stitch point over a plurality of said wide aspect ratio horizontal line signals.

7. A method as set forth in claim 6, wherein the location of at least one of said first and second stitch point is varied randomly within a predetermined range over said plurality of said wide aspect ratio horizontal line signals.

8. Apparatus for creating a wide aspect ratio display comprising a plurality of horizontal line signals, in response to a plurality of main panel component signals representing a main panel display and a corresponding multiplicity of augmentation panel component signals representing a single side augmentation panel display, said plurality of horizontal line signals constituting at least a portion of one field, said apparatus comprising:
  means for combining said plurality of main panel component signals with respective ones of said augmentation panel component signals to create respective horizontal line signals, wherein for each horizontal line signal of said respective horizontal line signals said main panel component signal is combined with the augmentation panel component signal at a stitch point; and
  means connected to said combining means for varying the location of said stitch point in at least one of said horizontal line signals relative to another of said horizontal line signals within said portion.

9. Apparatus as set forth in claim 8, wherein said combining means comprises first and second gating means for, respectively, gating said main panel component signals and said augmentation panel component signals, and timing means for controlling outputs of said first and second gating means over time; and
  wherein said stitch point location varying means comprises time varying means for operating in conjunction with said timing means to vary the control timing of said timing means with respect to said first and second means.

10. Apparatus as set forth in claim 9, wherein said first gating means comprises first memory means having constants stored in addressable memory locations, and first multiplier means having a first input connected to said memory means and a second input connected to receive said main panel component signals;
  wherein said second gating means comprises second memory means having addressable memory locations storing a plurality of constants, and second multiplier means having a first input connected to said second memory means and a second input connected to receive said augmentation panel signals;
  wherein said timing means comprising means for generating clock signals each defining a signal sample instant, means for generating horizontal synchronization signals for timing said horizontal line signals, counter means connected to receive said horizonta synchronization signals and said clock signals for furnishing counter output signals corresponding to a number of counted clock signals, and means applying said counter output signals to address inputs of said first and second memory means; and
  wherein said time varying means comprises means for changing said counter output signals prior application of said counter output signals to said address inputs of said first and second memory means.

11. Apparatus as set forth in claim 10, wherein said time varying means comprises a random number generator operative under control of said horizontal synchronization signals for generating random number signals within a predetermined range, and adding means for adding said random number signals to said counter output signals to constitute address signals for said first and second memory means.

12. Method for combining received main panel component signals representing a main panel display with respective ones of received augmentation panel component signals representing a single side augmentation panel display to generate wide aspect ratio horizontal line signals, said wide aspect ratio horizontal line signals constituting at least a portion of one field, comprising the steps of:
  combining said main panel component signals with respective augmentation panel component signals to constitute respective ones of said wide aspect ratio horizontal line signals wherein for a particular wide aspect ratio horizontal line signal of said wide aspect ratio horizontal line signals the main panel component signal is combined with the augmentation panel component at a stitch point; and
  varying the location of said stitch point in at least one of said wide aspect ratio horizontal line signals relative to another of said wide aspect ratio horizontal line signals within said portion thereby decreasing the visability of stitching in a wide aspect ratio display.

13. A method as set forth in claim 12, wherein said step of varying said location of said stitch point comprises randomly varying said location of said stitch point over a plurality of said wide aspect ratio horizontal line signals.

14. A method as set forth in claim 13, wherein the location of each said stitch point is varied randomly within a predetermined range over said plurality of said wide aspect ratio horizontal line signals.

* * * * *